United States Patent
Yamamoto et al.

(10) Patent No.: US 9,811,694 B2
(45) Date of Patent: Nov. 7, 2017

(54) MAGNETIC CARD READER AND TRANSACTION TERMINAL DEVICE HAVING THE SAME

(71) Applicant: PANASONIC INTELLECTUAL PROPERTY MANAGEMENT CO., LTD., Osaka (JP)

(72) Inventors: Naoki Yamamoto, Kanagawa (JP); Shunjiro Takemori, Fukuoka (JP); Kyohei Kida, Kanagawa (JP); Ryota Minami, Kanagawa (JP); Nobuyuki Gotou, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/432,264

(22) Filed: Feb. 14, 2017

(65) Prior Publication Data
US 2017/0249486 A1    Aug. 31, 2017

(30) Foreign Application Priority Data

Feb. 26, 2016   (JP) .................................. 2016-036373

(51) Int. Cl.
*G06K 7/08*   (2006.01)
*G06Q 20/34*  (2012.01)

(52) U.S. Cl.
CPC ............. *G06K 7/087* (2013.01); *G06Q 20/34* (2013.01)

(58) Field of Classification Search
CPC ............................... G06K 7/087; G06Q 20/34
USPC ......................................... 235/380, 449, 493
See application file for complete search history.

(56) References Cited

U.S. PATENT DOCUMENTS

| | | | |
|---|---|---|---|
| 7,051,932 B2 * | 5/2006 | Fernandes | G06K 7/084 235/383 |
| 7,699,225 B2 * | 4/2010 | Horiguchi | G06K 7/083 235/449 |
| 2004/0173679 A1 * | 9/2004 | Oki | G06K 7/084 235/449 |
| 2014/0041896 A1 | 2/2014 | Takahashi et al. | |

FOREIGN PATENT DOCUMENTS

| | | |
|---|---|---|
| JP | 06-150520 | 5/1994 |
| JP | 2011-138288 | 7/2011 |
| JP | 2012-203950 | 10/2012 |

* cited by examiner

*Primary Examiner* — Seung Lee
(74) *Attorney, Agent, or Firm* — Greenblum & Bernstein, P.L.C.

(57) ABSTRACT

Magnetic readers that read magnetic data which is recorded on a magnetic card and a flexible cable that transfers each of the signals from the magnetic readers to a signal processing circuit side are included, branch portions that are branched off from a main body of the flexible cable and are connected to the magnetic readers, respectively, are provided in the flexible cable, the branch portions have first and second main-body portion side end portions, respectively, that extend in parallel to each other along a card sliding passage, and the main-body portion has a branch portion side end portion that intersects the card sliding passage and extends.

9 Claims, 7 Drawing Sheets

MAGNETIC CARD READER AND TRANSACTION TERMINAL DEVICE HAVING THE SAME

BACKGROUND

1. Technical Field

The present disclosure relates to a magnetic card reader that reads a magnetic card and a transaction terminal device that includes the magnetic card reader.

2. Description of the Related Art

Magnetic cards in which necessary data is recorded on a magnetic stripe, such as a credit card, a cash card, and an ID card, are widely used. The data that is recorded on the magnetic card can be read with dedicated magnetic card reader. In a slide-type magnetic card reader, when a user passes the magnetic card through a slit (a card sliding passage), the magnetic card is slid in a state where the magnetic stripe comes into contact with a magnetic head (a magnetic reader) that is built into the slide-type magnetic card reader, and thus, the data that is recorded on the magnetic stripe is read as a magnetic signal.

For example, in a magnetic card reader that is disclosed in Japanese Patent Unexamined Publication No. 6-150520, a plurality of magnetic heads are arranged to face each other with a card sliding passage in between, and thus it is possible that both surface of the magnetic card are read. Furthermore, in Japanese Patent Unexamined Publication Nos. 2011-138288 and 2012-203950, a constitution is disclosed in which, in order to transfer a signal that is read with a magnetic head to an electric circuit for signal processing that is provided within a magnetic card reader, the magnetic head and the electric circuit are connected to each other with a flexible cable.

Incidentally, in the magnetic card reader that has a plurality of magnetic heads, when the flexible cable is individually installed for each magnetic head, because a wiring structure is complex and workability for assembling is low, it is desirable that a constitution in which a plurality of magnetic heads are connected to an electric circuit using one flexible cable (that is, one flexible cable into which flexible cables for a plurality of magnetic heads are integrally combined) is employed.

On the other hand, with the constitution in which the plurality of magnetic heads share one flexible cable in this manner, when the magnetic card that passes along the card sliding passage comes into contact with one magnetic head, in some cases, a movement (an external force) of the magnetic head due to this magnetic card's contact is transferred to other magnetic heads through the flexible cable (that is, other magnetic heads are displaced). Accordingly, when a state in which other magnetic heads does not directly face the magnetic stripe that passes along the card sliding passage, within a range of suitable angles, is achieved, in some cases, it is difficult to perform reading with the data on magnetic card being stabilized.

Particularly, in a case where a length of the flexible is more shortened in terms of miniaturization of the magnetic card reader, a phenomenon in which the external force from one magnetic head is transferred to other magnetic heads through the flexible cable is more remarkable. Furthermore, not only in the case where the length of the flexible cable is shortened, but also under low temperature, the phenomenon in which the external force from one magnetic head is transferred to other magnetic heads through the flexible cable is more remarkable.

SUMMARY

A primary object of the present disclosure is to suppress an external force from one magnetic reader from being transferred to other magnetic readers through a flexible cable although a constitution in which a plurality of magnetic readers that shares one flexible cable are provided is employed.

According to an aspect of the present disclosure, there is provided a magnetic card reader including: first and second magnetic readers that are arranged in such a manner as to face each other with a card sliding passage of a magnetic card in between, which reads magnetic data that is recorded on the magnetic card which passes along the card sliding passage; and one flexible cable that is connected to the first and second magnetic readers, which transfers each of the signals from the first and second magnetic readers to a signal processing circuit side, in which a main-body portion that is connected to a connector terminal which is provided to the signal processing circuit side, and first and second branch portions that are branched off from the main-body portion and that are connected to the first and second magnetic readers, respectively, are provided in the flexible cable, in which the first and second branch portions have first and second main-body portion side end portions, respectively, that extend in parallel to each other along the card sliding passage, and in which the main-body portion has a branch portion side end portion that intersects the card sliding passage and extends.

With the magnetic card reader in the disclosure, although a constitution in which a plurality of magnetic reader that share the same flexible cable are provided is employed, it is possible that an external force is suppressed from being transferred from one magnetic reader to other magnetic readers through a flexible cable.

DETAILED DESCRIPTION

An embodiment of the present disclosure will be described below with reference to the drawings.

Figure 1:
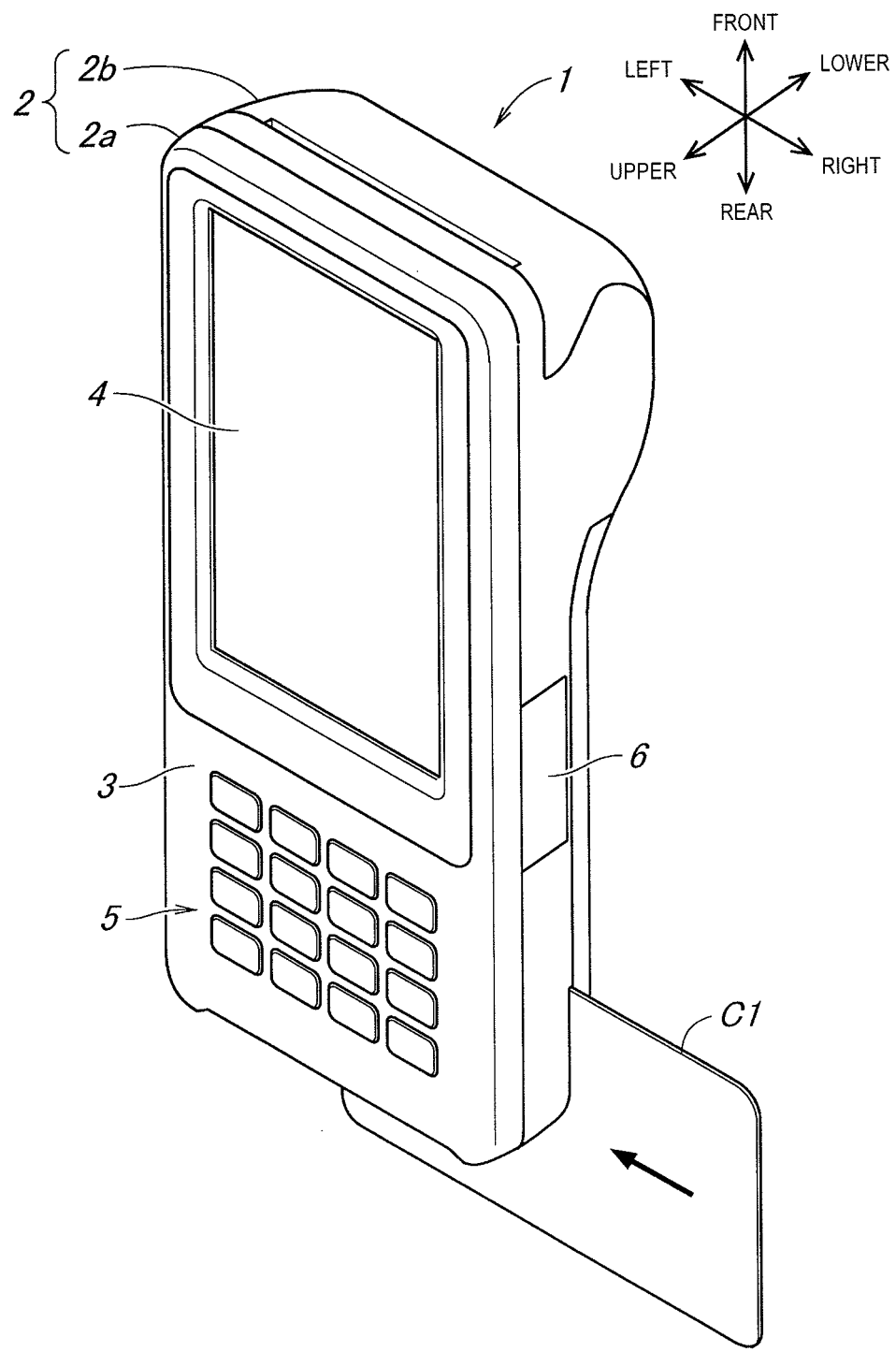
FIG. 1 is a perspective diagram of a transaction terminal device according to an embodiment.
Figure 2:
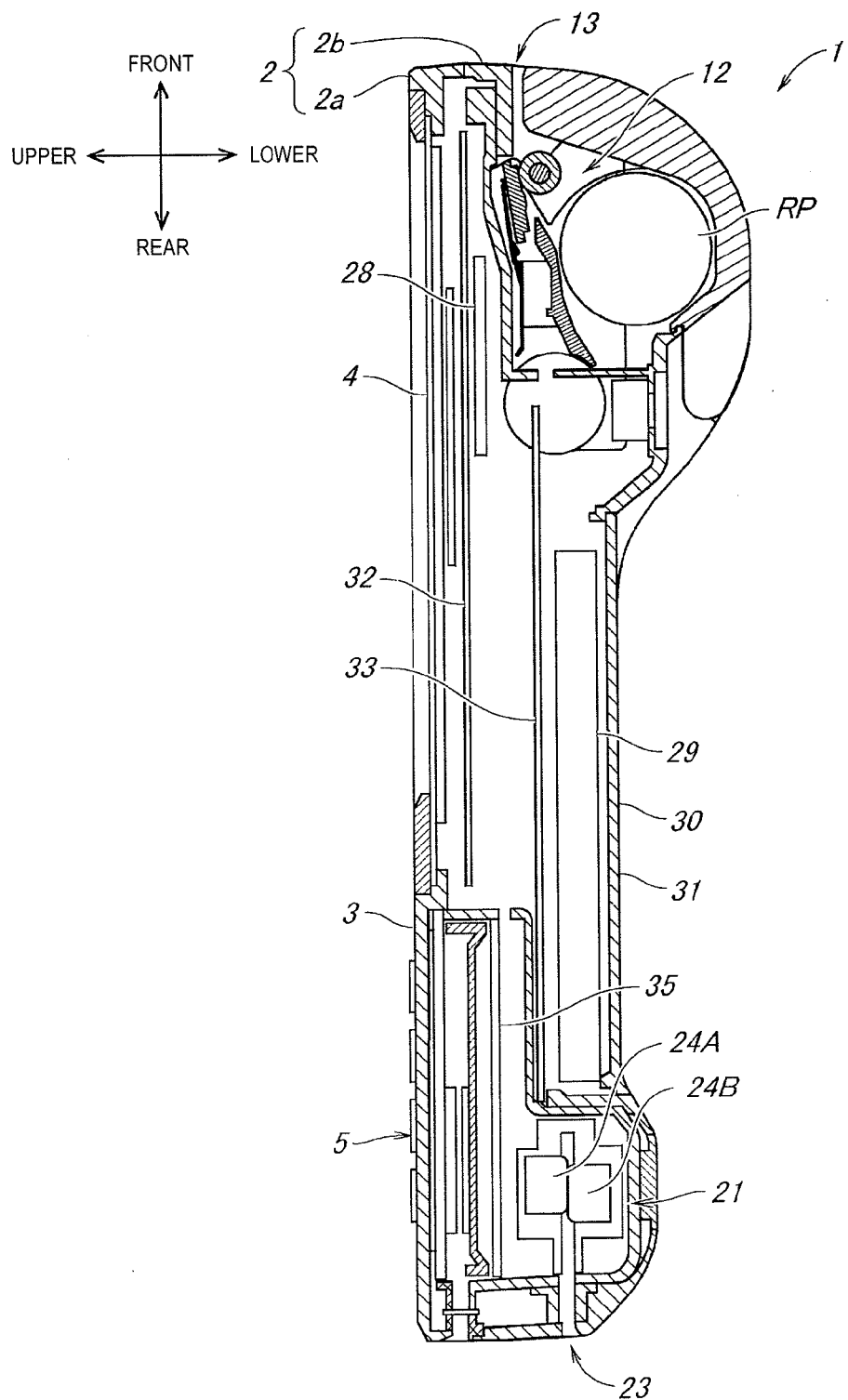
FIG. 2 is a vertical sectional diagram of the transaction terminal device according to the embodiment.

FIG. 1 and FIG. 2 are a perspective diagram and a vertical sectional diagram, respectively, of transaction terminal device 1 according to an embodiment of the present disclosure. A prescribed direction in FIGS. 1 and 2 is indicated with an arrow, but this is used only for convenience in description. Transaction terminal device 1 or an arrangement of constituent elements thereof is not limited to this (The same is true for FIGS. 3 to 6 to which reference will be made below).

As illustrated in FIG. 1, transaction terminal device 1 is a mobile settlement terminal that makes a payment in a cashless manner using magnetic card C1 as a credit card, a cash car, or the like, and display input panel 4 and keypad unit 5 are arranged on front surface 3 of case 2.

Case 2 is constituted from upper case 2a and lower case 2b. Display input panel 4 is a so-called touch panel display that results from combining a liquid crystal display panel and a touch panel. Arranged in keypad unit 5 are a plurality of operation keys, specifically, a power key, and unit keys, such as numeric keys and function keys. Furthermore, cover 6 that covers a power plug and a memory card slot is provided in a flank side portion of case 2.

As illustrated in FIG. 2, transaction terminal device 1 includes printer 12. Printer 12 is a so-called thermal printer that performs printing on a recording paper using thermo-sensitivity method. In printer 12, the printing is performed on a sheet of recording paper that is unwound from a reel of paper RP that results from rolling up sheets of recording paper, and the resulting sheet of recording is ejected from paper ejection opening 13.

Furthermore, slide-type magnetic card reader 21 is provided inside of case 2. Magnetic card reader 21 reads magnetic card C1 (refer to FIG. 1) that is inserted into card slot (card sliding passage) 23 which is provided on an end portion of case 2. Magnetic card C1 is a so-called magnetic stripe card in compliance with prescribed specifications (a JIS I type, a JIS type II, and the like). A magnetic stripe (a magnetic tape) is provided on both surfaces of one surface of magnetic card C1. When magnetic card C1 is inserted into card slot 23, first and second magnetic heads 24A and 24B (hereinafter collectively refers to "magnetic head 24") come into contact with a magnetic stripe. Information that is recorded on the magnetic stripe can be read by a swiping operation of sliding magnetic card C1 horizontally. In this manner, card slot 23 for a magnetic card has openings in three directions in order to slide the magnetic card. Sliding direction of magnetic card C1 is not limited to a direction that is indicated by an arrow which is attached to magnetic card C1 in FIG. 1, and it is also possible that magnetic card C1 is slid in the reverse direction.

Furthermore, communication module 28 and battery 29 are provided inside of case 2. Communication module 28 performs wireless communication between transaction terminal device 1 and a server (not illustrated) of a payment processing system. Battery 29 supplies power to each unit of transaction terminal device 1. Battery cover 31 that closes an opening for inserting and removing battery 29 is provided to battery accommodation unit 30 in which battery 29 is accommodated.

In transaction terminal device 1, a payment can be made in a cashless manner using magnetic card C1, and a backup statement on which details of the payment are recorded can be printed out. In addition, transaction terminal device 1 may be equipped with a function of performing user identification that uses an ID card, for example, performing identification of a user of transaction terminal device 1. Furthermore, a function of reading not only magnetic card C1, but also a contact-type IC card, a non-contact type IC card, or the like may be further added to transaction terminal device 1.

Main board 32 and a sub-board 33 are provided on the rear surface side of display input panel 4 inside of case 2. Various electronic components for controlling each unit of transaction terminal device 1 are mounted on main board 32 and sub-board 33. For example, the liquid crystal display panel and the touch panel that constitute display input panel 4 are connected to and electronic components that perform control of these are mounted on main board 32. Furthermore, signal processing board 35 is positioned on the rear surface side of keypad unit 5 inside of case 2. Signal processing board is equipped with a known signal processing circuit (for example, an amplification circuit, a demodulation circuit, or the like) for processing a magnetic signal (an analog signal) from magnetic head 24, which is output by magnetic card C1's reading. The known signal processing circuit is electrically connected to magnetic head 24.

Figure 3:
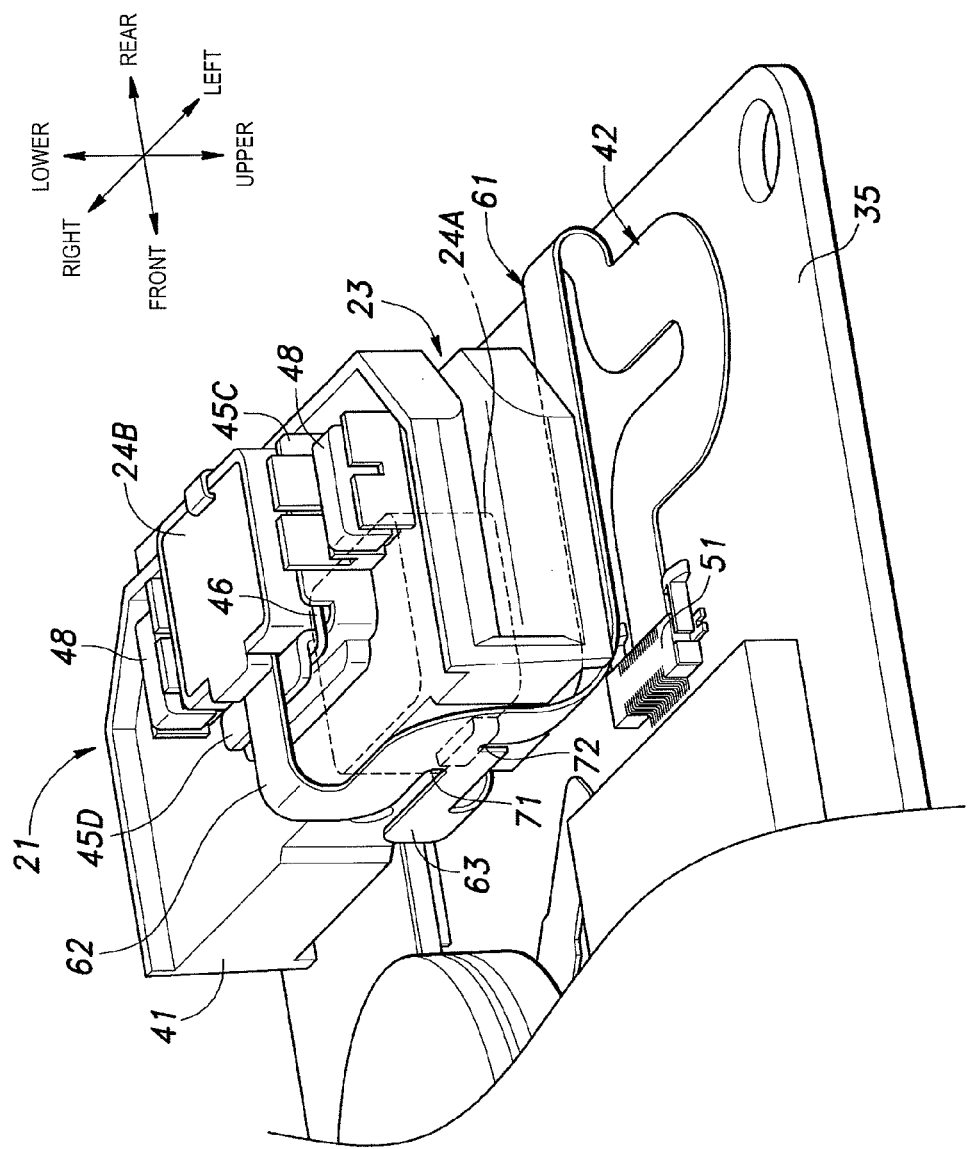
FIG. 3 is a perspective diagram illustrating a magnetic card reader in a state of being attached to a signal processing board according to the embodiment.
Figure 4:
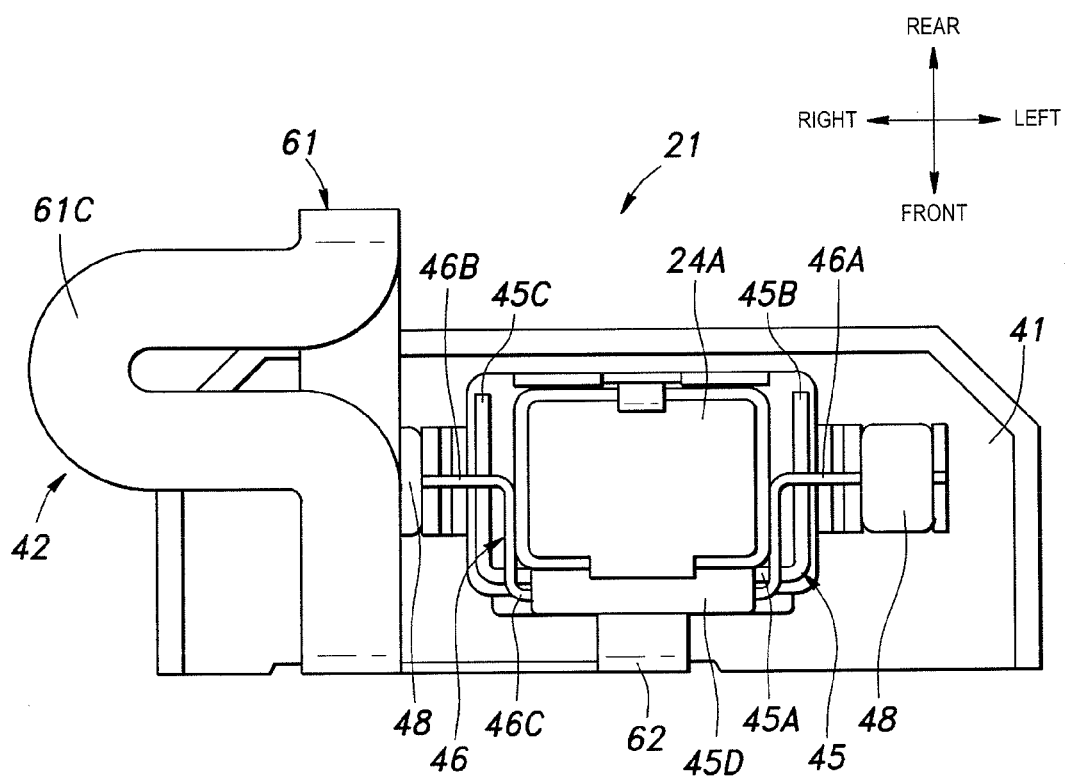
FIG. 4 is a diagram of an upper surface of the magnetic card reader according to the embodiment.
Figure 5:
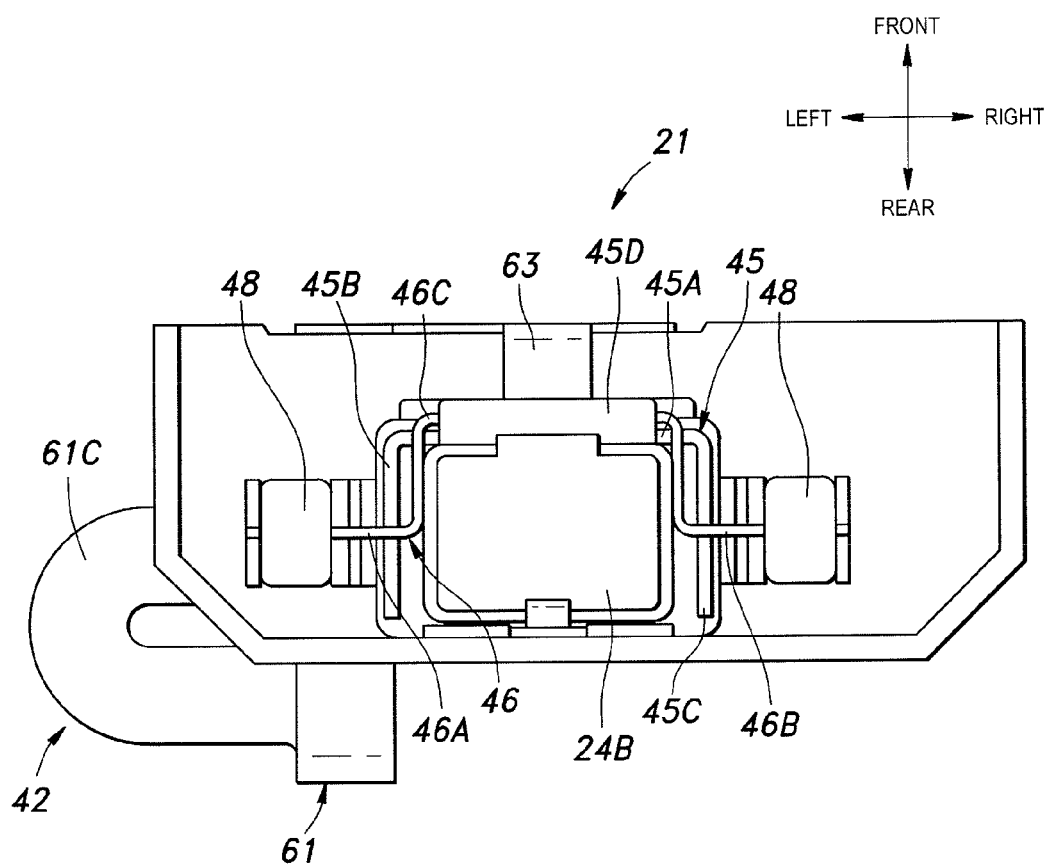
FIG. 5 is a diagram of a lower surface of the magnetic card reader according to the embodiment.
Figure 6:
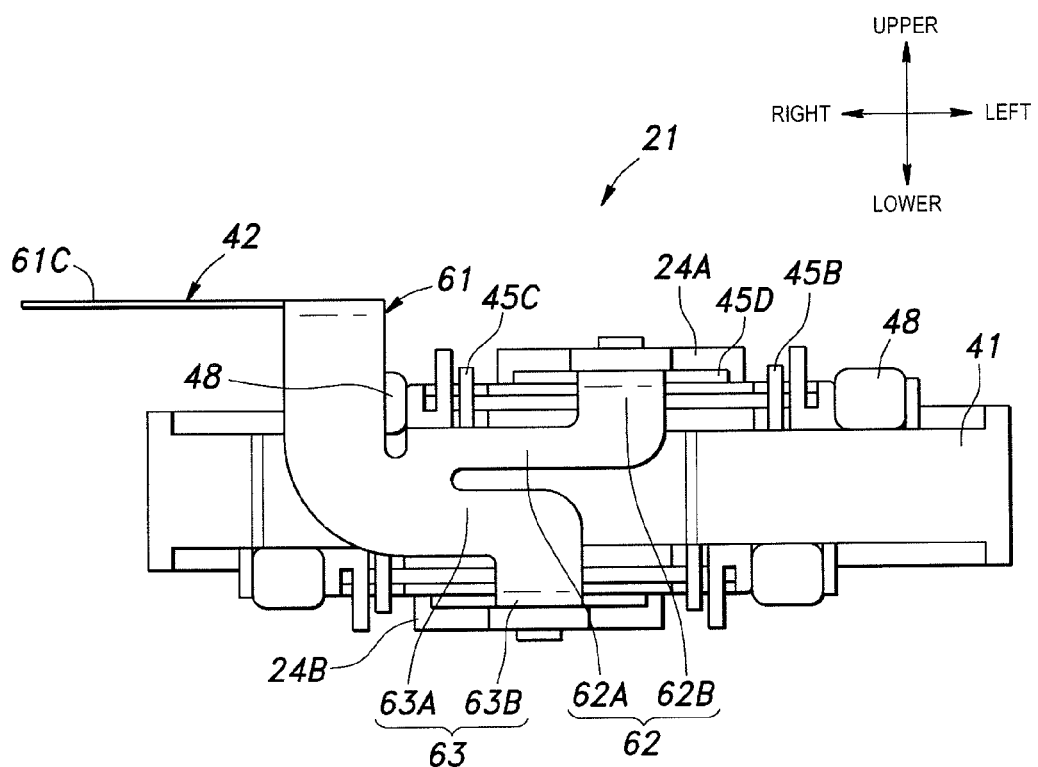
FIG. 6 is a diagram of a flank surface of the magnetic card reader according to the embodiment.
Figure 7:
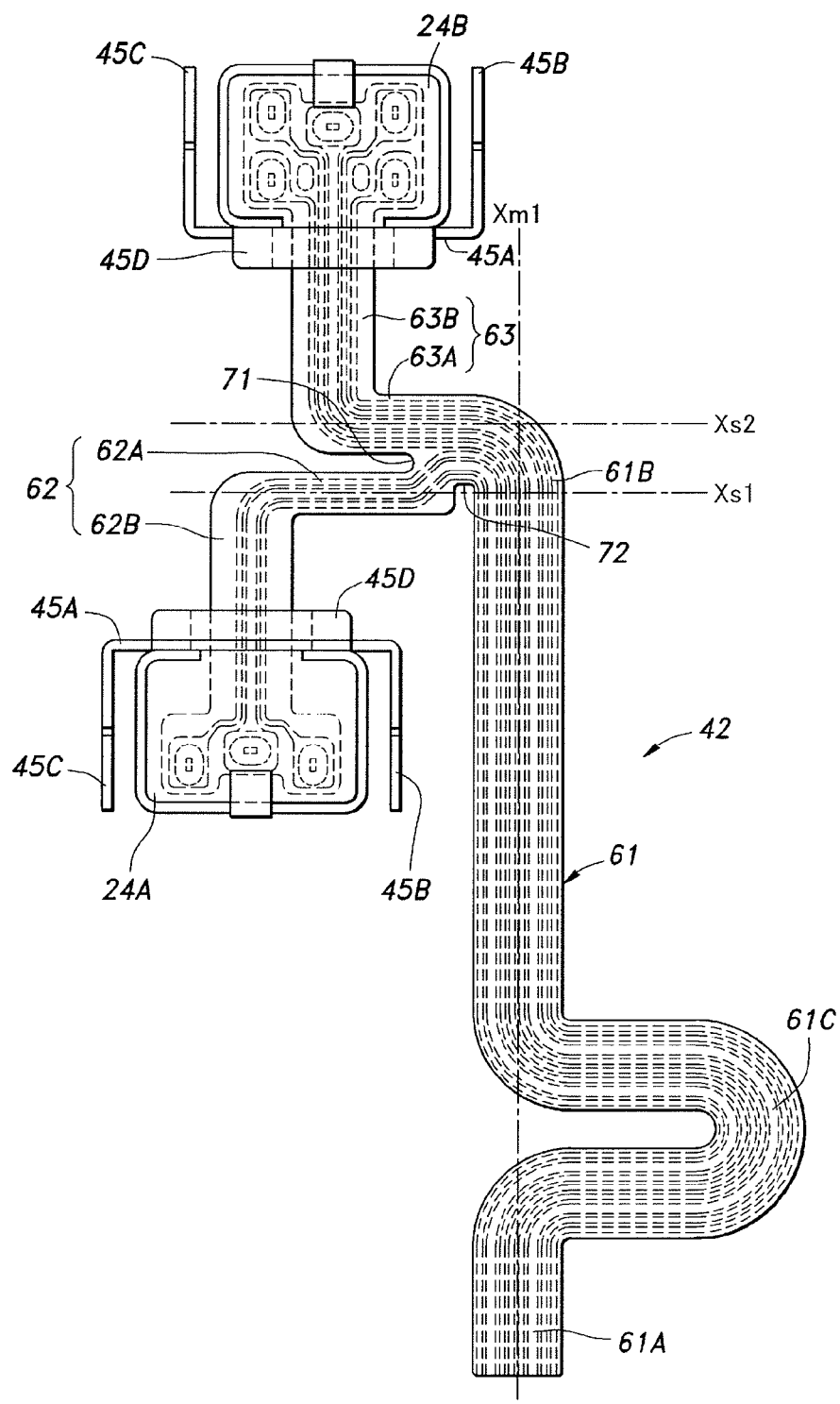
FIG. 7 is a plan diagram illustrating an installed state of a flexible cable that is connected to a magnetic head of the magnetic card reader according to the embodiment.

FIG. 3 is a perspective diagram (on the lower surface side) of magnetic card reader 21. FIGS. 4, 5, and 6 are diagrams of an upper surface, a lower surface, and a flank surface of magnetic card reader 21, respectively. FIG. 7 is a plan diagram illustrating an installed state of flexible cable 42 that is connected to magnetic head 24.

As illustrated in FIG. 3, magnetic card reader 21 includes main-body case (passage formation member) 41 in which card slot (card sliding passage) 23 for the magnetic card is formed. Main-body case 41 assumes approximately a left-turned "U" shape when viewed from the side. Both of magnetic heads 24A and 24B are arranged over and under main-body case 41, respectively, in such a manner that both of magnetic heads 24A and 24B faces each other with card slot 23 in between. Furthermore, flexible cable 42, which is constituted from flexible printed circuits (FPC) in order to signals from both of magnetic heads 24A and 24B to the signal processing board 35 side, is positioned in magnetic card reader 21. When it comes to a structure of flexible cable 42, a known structure in which upper and lower surfaces of a conductor are covered with a protective layer can be employed. Magnetic card reader 21 is fixed (screwed) to an attachment portion (not illustrated) that is formed in case 2, in a state of being vertically separated from signal processing board 35.

As illustrated in FIG. 4, first magnetic head 24A takes on approximately a rectangle shape when viewed from above, and head frame 45, which is formed in such a manner as to surround three sides (front, left, and right sides) of magnetic head 24, is provided as an attachment. In head frame 45, front wall 45A of head frame 45 is fixed to magnetic head 24, and left wall 45B and right wall 45C that are provided to extend from front wall 45A of head frame 45 are separated a prescribed distance from left and right flank surfaces, respectively, of magnetic head 24. Furthermore, as will be in detail below, one end of flexible cable 42 is connected to a front surface of first magnetic head 24A.

Additionally, support spring 46, which supports magnetic head 24 with respect to main-body case 41, is attached to head frame 45. Support spring 46 is a rod-shaped spring that has a plurality of bent portions, and has left and right axis portions 46A and 46B that are provided to extend in a horizontal direction of magnetic head 24, and concave portion 46C that is positioned in such a manner as to link inside ends of axis portions 46A and 46B and surround a front portion of magnetic head 24. Left and right axis portions 46A and 46B are rotatably supported by a pair of support members 48 that are arranged to the left and right sides, respectively, of magnetic head 24 in main-body case 41, and concave portion 46C is fixed to a lower surface of flange portion 45D that is provided on front wall 45A of head frame 45.

Structures of second magnetic head 24B and the vicinity thereof, which are illustrated in FIG. 5, are also the same as those of first magnetic head 24A and the vicinity thereof described above.

With this constitution, each of magnetic heads 24A and 24B is elastically supported by support spring 46 with respect to main case 41, in a state where both of signal detection units of magnetic heads 24A and 24B directly face magnetic card C1 (a magnetic stripe portion). Furthermore, as illustrated in FIG. 2, because both of magnetic heads 24A and 24B are arranged in such a manner as to vertically close one portion of card slot 23, when magnetic card C1 passes through card slot 23, magnetic heads 24A and 24B are pressed by magnetic card C1 to the outside of card slot 23 against an added force of support spring 46.

As illustrated in FIG. 6, in order to prevent mutual interference, both of magnetic heads 24A and 24B (signal detectors) are arranged in such a manner that central positions thereof are at least different from each other (that is, are separated only a prescribed distance) in a card-sliding direction (horizontally in FIG. 6) of card slot 23.

As illustrated in FIG. 7, flexible cable 42 has main-body portion 61 that connects base end portion 61A to connector terminal 51 (refer to FIG. 3) which is provided on signal processing board 35, and first and second branch portions 62 and 63 that are branched off from one end side (branch portion side end portion 61B) of main-body portion 61 and that are connected to both of magnetic heads 24A and 24B, respectively. At least in the installed state of flexible cable 42, extending direction Xm1 (which, at this point, is also equivalent to an extending direction of main-body portion 61) of branch portion side end portion 61B in main-body portion 61 extends a direction of intersecting (preferably, perpendicularly intersecting) both of extending direction Xs1 of main-body portion side end portion (a first main-body portion side end portion) 62A in first branch portion 62 and extending direction Xs2 of main-body portion side end portion (a second main-body portion side end portion) 63A in second branch portion 63. As illustrated in FIG. 3, main-body portion 61 extends to intersect card slot 23 (that is, sliding direction magnetic card C1). Furthermore, main-body portion side end portions 62A and 63A extend in parallel to each other along card slot 23.

With this constitution, although a constitution in which two magnetic head 24A and 24B that share one flexible cable 42 are provided is employed, it is possible in magnetic card reader 21 that an external force from one magnetic head is suppressed from being transferred to the other magnetic head through flexible cable 42. For example, the magnetic card comes into contact with first magnetic head 24A and thus first magnetic head 24A is displaced. Accordingly, even in a case where a connection end (head side end portion 62B) of first branch portion 62 is displaced with respect to first magnetic head 24A, displacement of the connection end is absorbed by bending of first branch portion 62 and second branch portion 63 (particularly, main-body portion side end portions 62A and 63A), and thus the displacement (the external force) is suppressed from being transferred to first magnetic head 24A. As a result, it is possible that magnetic heads 24A and 24B stably read. An effect of stabilizing the reading of the magnetic card is effective even in a case where deformation due to heat or the like occurs to the magnetic card that is a reading target, in a case where, card slot 23, the magnetic card is inclined from a normal sliding direction, or the like.

U-shaped portion 61C is provided in the middle of main-body portion 61, and thus an operation of making a connection to connector terminal 51 of flexible cable 42 is made easy.

Furthermore, in first branch portion 62, head side end portion (first reader side end portion) 62B that runs to the first magnetic head 24A side of main-body portion side end portion 62A of first branch portion 62 is formed. Head side end portion 62B extends from first magnetic head 24A toward main-body portion side end portion 62A (the second magnetic head 24B side) in such a manner that head side end portion 62B intersects (preferably, perpendicularly intersects) an extending direction of main-body portion side end portion 62A.

In the same manner, in second branch portion 63, head side end portion (second reader side end portion) 63B that runs to the second magnetic head 24B side of main-body portion side end portion 63A of second branch portion 63 is formed. Head side end portion 63B extends from second magnetic head 24B toward main-body portion side end portion 63A (the first magnetic head 24A side) in such a manner that head side end portion 63B intersects (preferably, perpendicularly intersects) an extending direction of main-body portion side end portion 63A. Head side end portion 63B extends in parallel to head side end portion 62B in a different position in a sliding direction (the horizontal direction in FIG. 6) of the magnetic card.

First slit 71 that extends toward branch portion side end portion 61B in main-body portion 61 is formed between main-body portion side end portions 62A and 63A in first and second branch portions 62 and 63. First slit 71 has approximately the same width except for an end portion thereof. Accordingly, a distance between outer edges between main-body portion side end portions 62A and 63A that are arranged with first slit 71 in between is made to be larger than the width of main-body portion 61. Furthermore, second slit 72 is formed between main-body portion side end portion 62A and branch portion side end portion 61B, and second slit 72 extends in a direction of intersecting (preferably, perpendicularly intersecting) first slit 71. Second slit 72 has approximately the same width except for an end portion thereof. Furthermore, branch portion side end portion 61B in main-body portion 61 extends in parallel to head side end portions 62B and 63B. With this constitution, although a constitution in which a plurality of magnetic headers that share the same flexible cable are provided is employed, it is possible that an external force from one magnetic header is suppressed from being transferred to the other magnetic header through the flexible cable. Furthermore, under low temperature, a phenomenon in which an external force from one magnetic head is transferred to the other magnetic head through the flexible cable occurs less frequently.

According to the present embodiment, first magnetic head 24A has one track, and second magnetic head 24B has two tracks. Accordingly, more conductors are needed in second branch portion 63 that in first branch portion 62, and second branch portion 63 has a wider width than first branch portion 62. However, no limitation to this is imposed, and it is possible that the number of tracks in both of magnetic heads 24A and 24B is suitably changed.

A magnetic card reader in the present disclosure includes: first and second magnetic readers that are arranged in such a manner as to face each other with a card sliding passage of a magnetic card in between, which reads magnetic data that is recorded on the magnetic card which passes along the card sliding passage; and one flexible cable that is connected to the first and second magnetic readers, which transfers each of the signals from the first and second magnetic readers to a signal processing circuit side, in which a main-body portion that is connected to a connector terminal which is provided to the signal processing circuit side, and first and second branch portions that are branched off from the main-body portion and that are connected to the first and second magnetic readers, respectively, are provided in the flexible cable, in which the first and second branch portions have first and second main-body portion side end portions, respectively, that extend in parallel to each other along the card sliding passage, and in which the main-body portion has a branch portion side end portion that intersects the card sliding passage and extends.

In the magnetic card reader in the present disclosure, because displacement that occurs in one magnetic reader is able to be absorbed in the first and second branch portions, although a constitution in which a plurality of magnetic readers that shares one flexible cable are provided is employed, an external force is suppressed from being transferred from one magnetic reader to another magnetic reader through the flexible cable.

In the magnetic card reader in the present disclosure, according to the exemplary embodiment described above, the first and second main-body portion side end portions are connected to the branch portion side end portion of the main-body portion.

In the magnetic card reader in the present disclosure, with the first and second main-body portion side end portions and the branch portion side end portion of the main-body portion, the external force is suppressed from being transferred from one magnetic reader to another magnetic reader through the flexible cable.

The first branch portion of the magnetic card reader in the present disclosure further includes a first reader side end portion that extends in a direction of intersecting the first main-body side end portion and is connected to the first magnetic reader, and the second branch portion further has a second reader side end portion that extends in a direction of intersecting the second main-body portion side end portion and is connected to the second magnetic reader.

In the magnetic card reader in the present disclosure, the first and second main-body side end portions and the first and second reader side end portions suppress the external force from being transferred from one magnetic reader to another magnetic reader through the flexible cable.

The first and second main-body portion side end portions of the magnetic card reader in the present disclosure extend in directions of intersecting extending directions of the first and second reader side end portions, respectively.

In the magnetic card reader in the present disclosure, although a compact constitution in which substantial lengths (that is, lengths of the first and second reader side end portions) of the first and second branch portions are more shortened is employed, the external force is suppressed from being transferred from one magnetic reader to another magnetic reader through the flexible cable.

The branch portion side end portion in the main-body portion of the magnetic card reader in the present disclosure extends in parallel to the extending directions of the first and second reader side end portions.

In the magnetic card reader in the present disclosure, a wiring space of the flexible cable becomes more compact.

In the magnetic card reader in the present disclosure, a first slit that extends toward the branch portion side end portion in the main-body portion is formed between the first and second main-body portion side end portions.

In the magnetic card reader in the present disclosure, a size (width) of the first slit is adjusted and thus the external force is suppressed from being transferred from one magnetic reader to another magnetic reader through the flexible cable.

A second slit is formed between the first main-body portion side end portion and the branch portion side end portion of the magnetic card reader in the present disclosure, and the second slit extends in a direction of intersecting the first slit.

In the magnetic card reader in the present, disclosure, a size (width) of the second slit is adjusted and thus the external face is suppressed from being transferred from one magnetic reader to another magnetic reader through the flexible cable.

The first and second magnetic readers of the magnetic card reader in the present disclosure are arranged in different positions in sliding directions of the magnetic card along the card sliding passage.

In the magnetic card reader in the magnetic card reader, the external force is suppressed from being transferred from one magnetic reader to another magnetic reader through the flexible cable while mutual interference is suppressed when the first and second magnetic readers perform reading.

A transaction terminal device that includes the magnetic card reader in the present disclosure and a case that accommodate the magnetic card reader has the constitution in which displacement that occurs in one magnetic reader is able to be absorbed in the first and second branch portions. Because of this, although the constitution in which the plurality of magnetic readers that shares one flexible cable are provided is employed, the external force is suppressed from being transferred from one magnetic reader to another magnetic reader through the flexible cable.

The present disclosure is provided above based on the specific embodiments, but the embodiments are only examples, and the present disclosure is not limited by the embodiments. For example, the magnetic card reader in the present disclosure is not limited to the transaction terminal device described above, and is possibly applied to an arbitrary apparatus (for example, an access management apparatus that performs personal authentication using the magnetic card) that is equipped with a function of reading the magnetic card. Furthermore, the magnetic card reader in the present disclosure is not limited to the two magnetic heads described above, and it possibly includes three or more magnetic heads as well. In this case, a constitution can be employed in which one flexible cable in the present disclosure transfers each of the signals from the three or more magnetic heads to the signal processing circuit side. All of the magnetic card reader and the constituent elements of the transaction terminal device that includes the magnetic card reader are not necessarily essential, and it is possible to make a suitable selection from among the all constituent elements at least within a range that does not depart from the scope of the present disclosure.

What is claimed is:

1. A magnetic card reader comprising:
   first and second magnetic reader that are arranged in such a manner as to face each other with a card sliding passage of a magnetic card in between, which read magnetic data which is recorded on the magnetic card that passes along the card sliding passage; and
   one flexible cable that is connected to the first and second magnetic readers, which transfers each of the signals from the first and second magnetic readers to a signal processing circuit side, wherein the one flexible cable comprising:
a main-body portion that is connected to a connector terminal which is provided to the signal processing circuit side,
a first branch portion that is branched off from the main-body portion, that is connected to the first magnetic readers and that has first main-body portion side end portion,
a second branch portion that is branched off from the main-body portion, that is connected to the second magnetic readers and that has second main-body portion side end portion,
wherein the first and the second main-body portion side end portions extend in parallel to each other along the card sliding passage, and
wherein the main-body portion has a branch portion side end portion that intersects the card sliding passage and extends.

2. The magnetic card reader of claim 1,
wherein the first and second main-body portion side end portions are connected to the branch portion side end portion of the main-body portion.

3. The magnetic card reader of claim 1,
wherein the first branch further includes a first reader side end portion that extends in a direction of intersecting the first main-body side end portion and is connected to the first magnetic reader, and
wherein the second branch portion further has a second reader side end portion that extends in a direction of intersecting the second main-body portion side end portion and is connected to the second magnetic reader.

4. The magnetic card reader of claim 3,
wherein the first and second main-body portion side end portions extend in directions of intersecting extending directions of the first and second reader side end portions, respectively.

5. The magnetic card reader of claim 3,
wherein the branch portion side end portion in the main-body portion extends in parallel to the extending directions of the first and second reader side end portions.

6. The magnetic card reader of claim 1,
wherein a first slot that extends toward the branch portion side end portion in the main-body portion is formed between the first and second main-body portion side end portions.

7. The magnetic card reader of claim 6,
wherein a second slot is formed between the first main-body portion side end portion and the branch portion side end portion, and
wherein the second slit extends in a direction of intersecting the first slit.

8. The magnetic card reader of claim 1,
wherein the first and second magnetic readers are arranged in different positions in sliding directions of the magnetic card along the card sliding passage.

9. A transaction terminal device comprising:
the magnetic card reader of claim 1; and
a case that accommodates the magnetic card reader.

* * * * *